Figure 1:
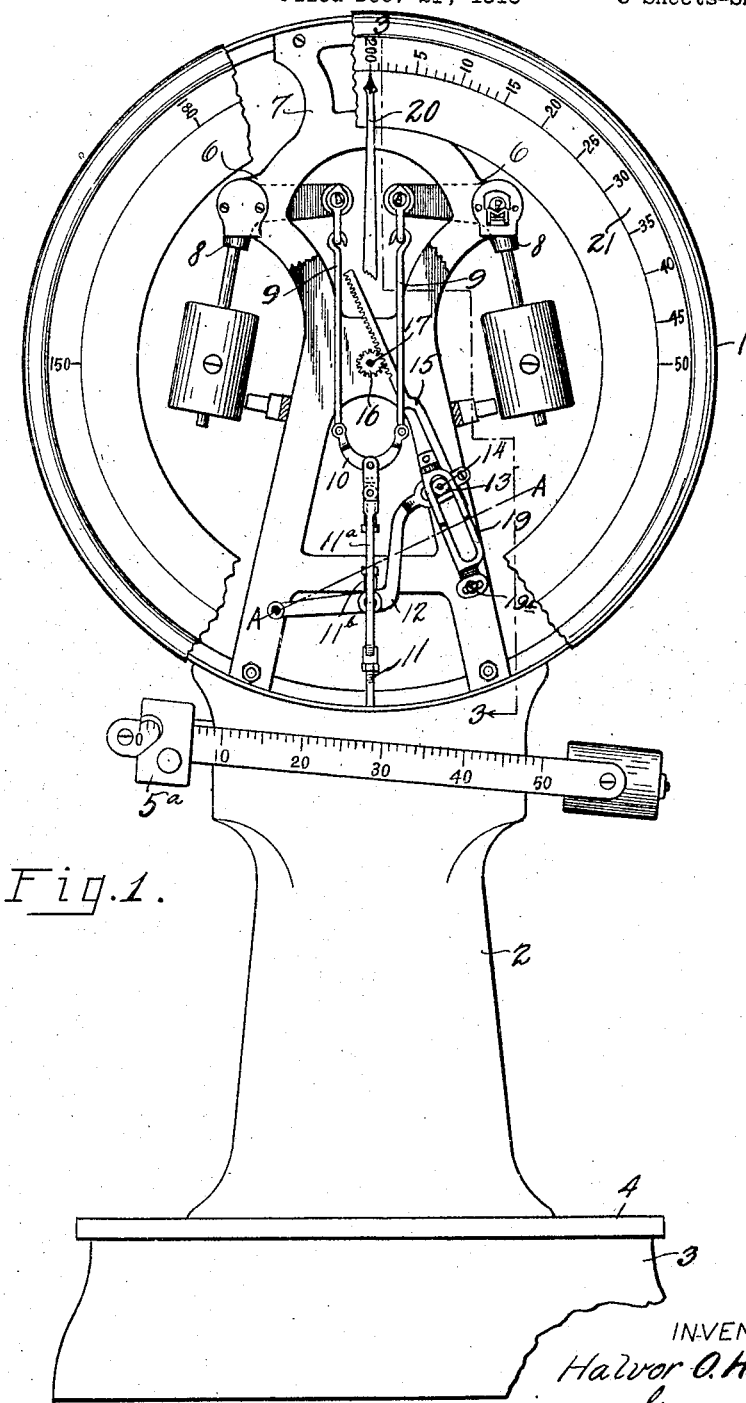

May 1, 1923.

H. O. HEM

WEIGHING SCALE

Filed Dec. 21, 1916

1,453,353

6 Sheets-Sheet 1

INVENTOR.
Halvor O. Hem
by George R. Frye
Atty.

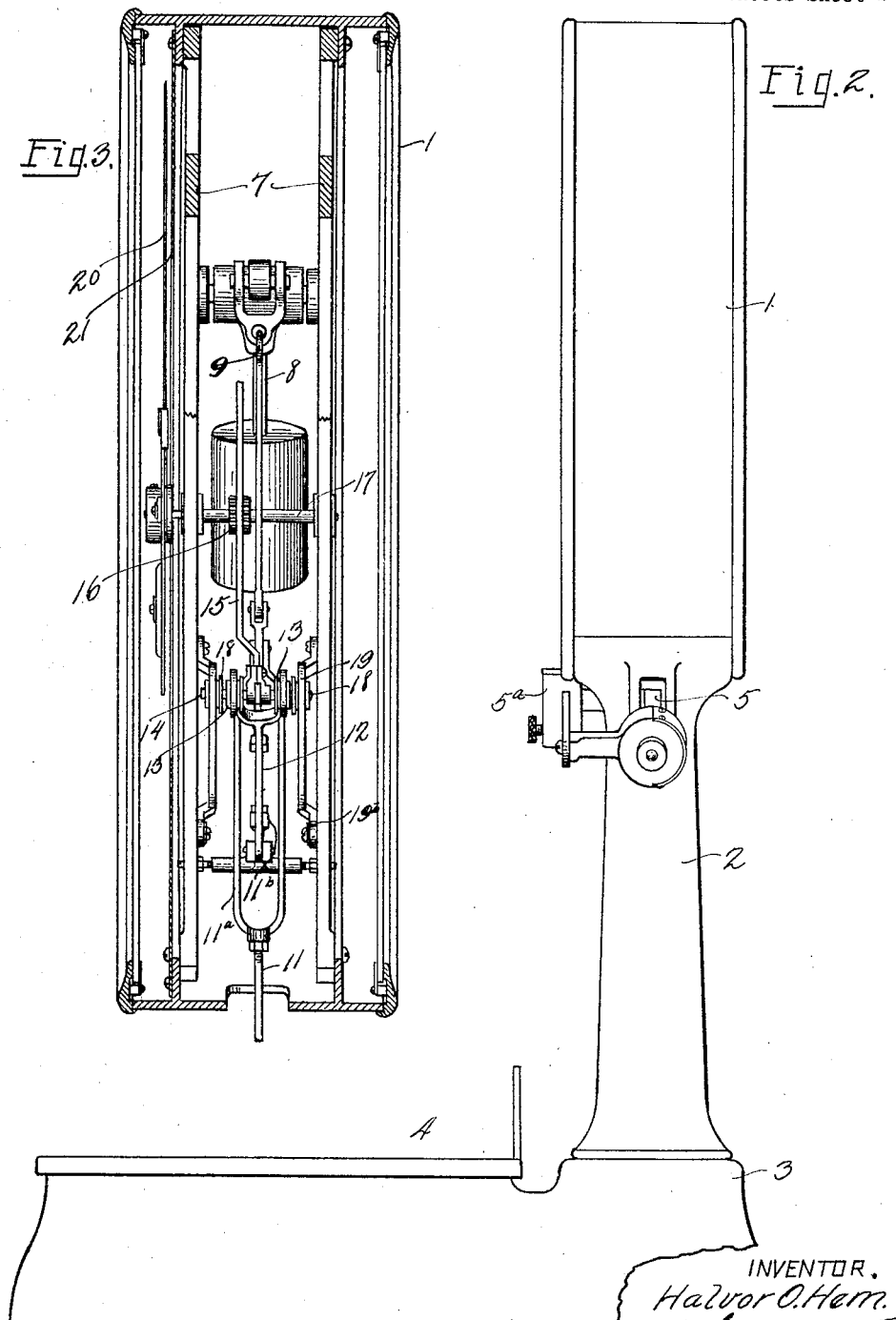

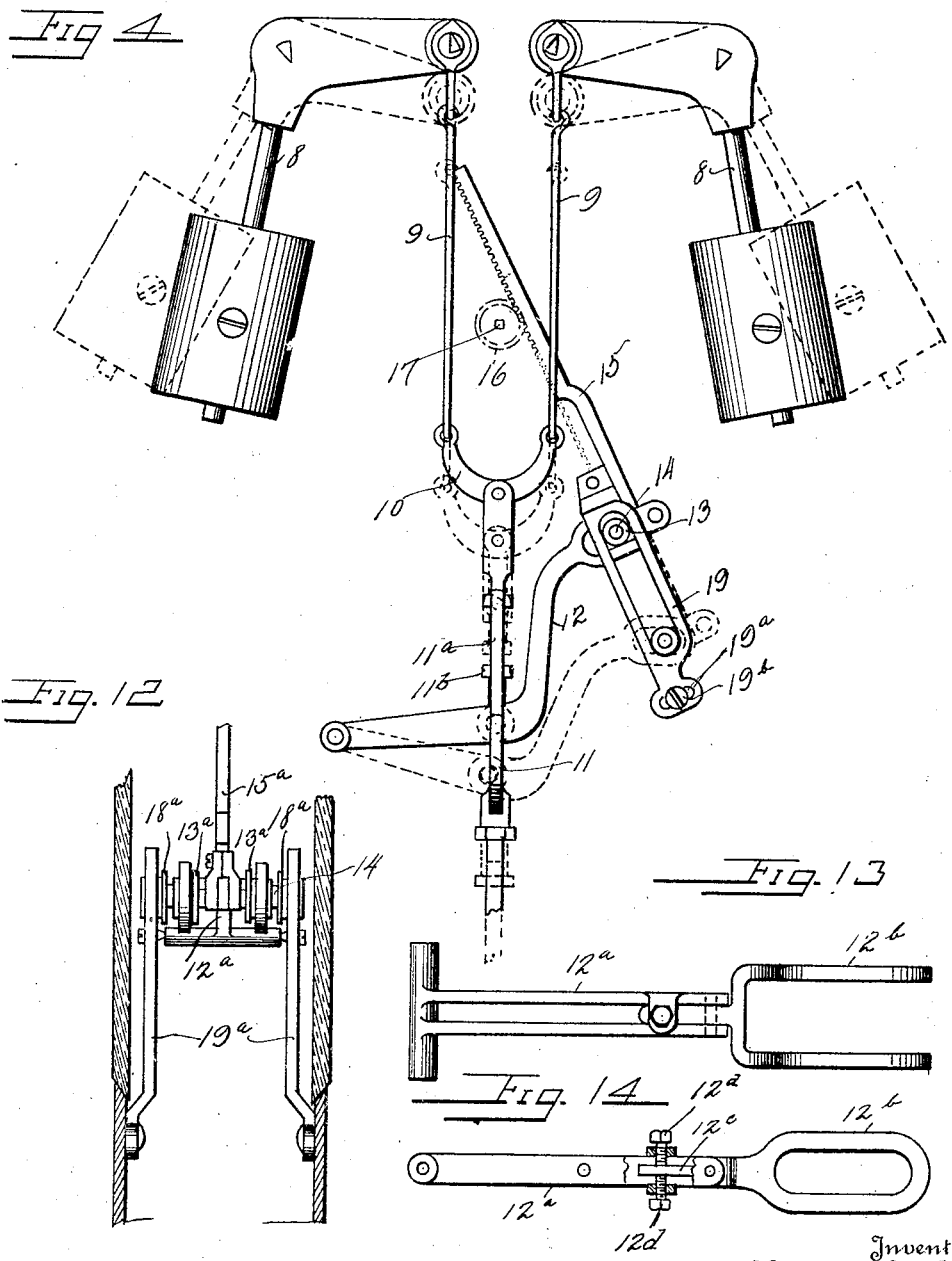

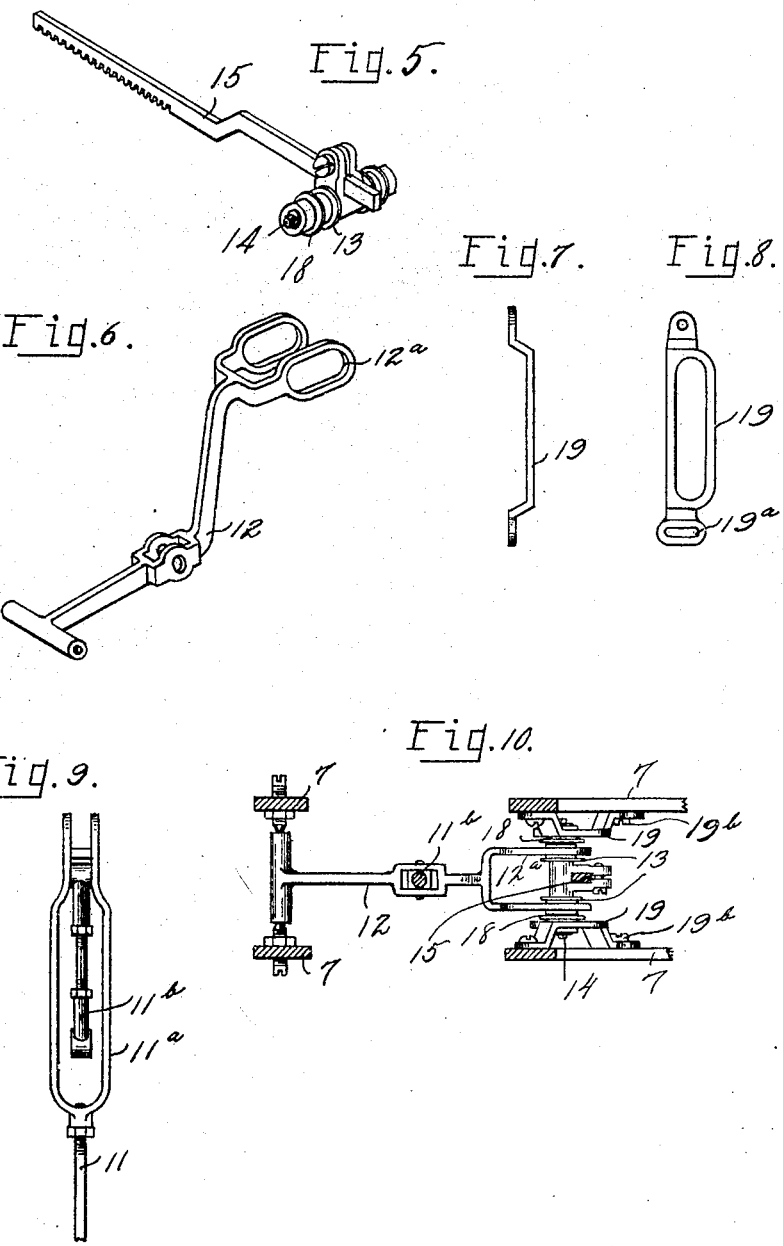

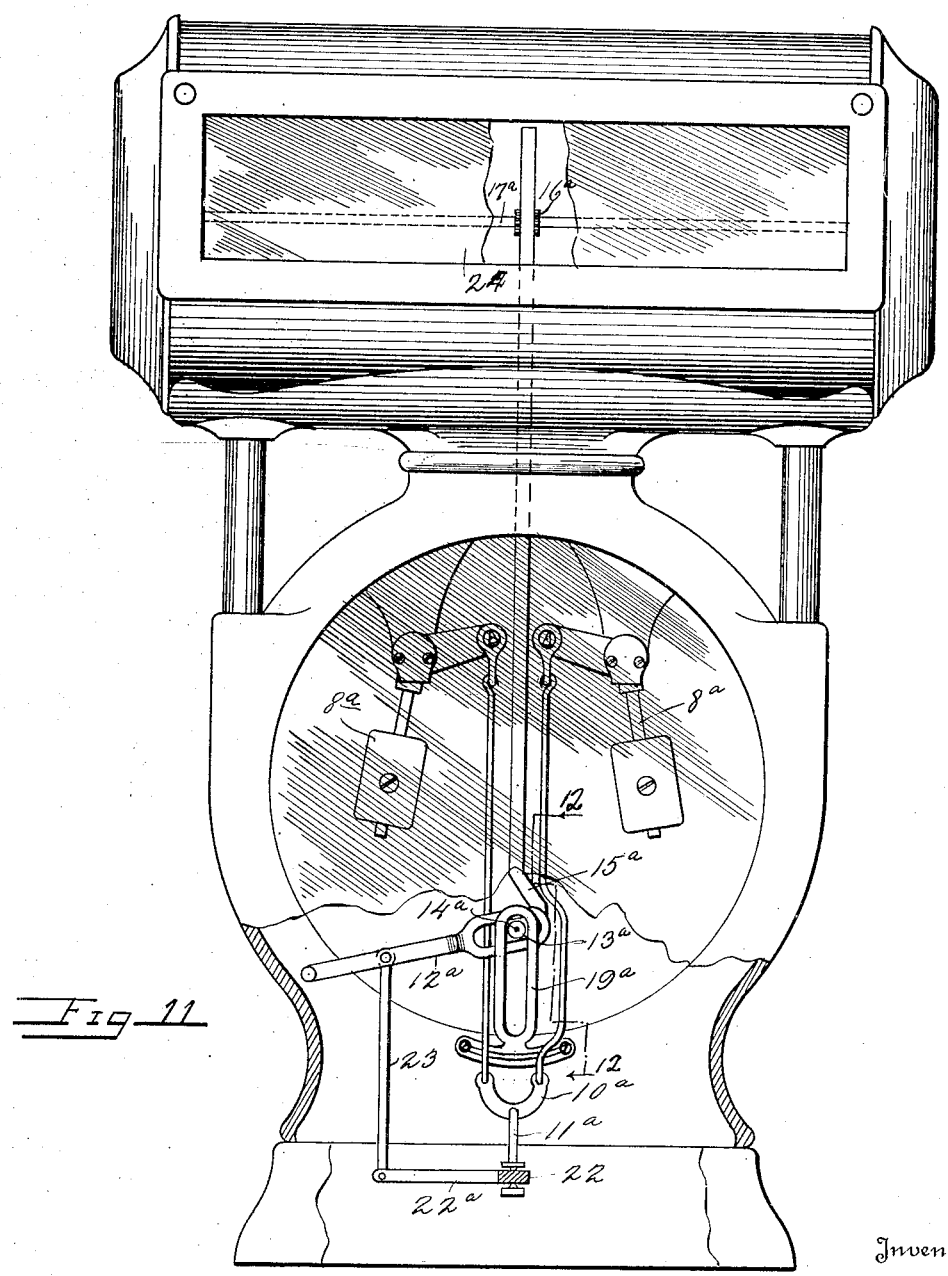

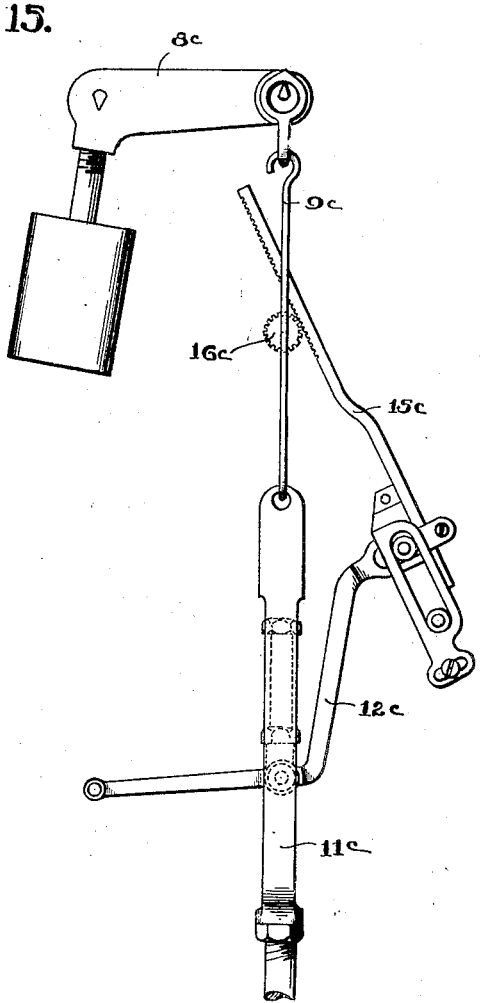

Patented May 1, 1923.

1,453,353

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 21, 1916. Serial No. 138,198.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to pendulum weighing scales, and more specifically to the weighing mechanism thereof. One of the characteristics of pendulum scales having fixed bearings and a link and pivot connection with the main lever is that as the pendulum weight swings outwardly and the pivot and link move downwardly, step by step, the leverage of the pendulum gradually changes and the movement of the indicator over the chart is not uniform.

This invention has for its primary object to overcome the objections to scales of this type and enable the use of pendulums resting in fixed bearings and positively connected to the actuating levers with evenly graduated indicating charts by providing means for uniformly driving the index hand from the pendulums despite the unequal movements of the pendulums as successive increments are added to the load.

Other objects and advantages will readily appear from the following description, wherein preferred embodiments of my invention are described and particularly pointed out in the subjoined claims.

Reference is had to the accompanying drawings illustrating preferred embodiments of my invention and wherein similar reference numerals designate similar parts throughout the several views.

In the drawings:—

Fig. 1 is a front elevation of a scale equipped with my invention; Fig. 2 is a side elevation thereof; Fig. 3 is an enlarged vertical section through the weighing mechanism, taken substantially on the line 3—3 of Fig. 1; Fig. 4 is an enlarged diagrammatic view of my improved weighing mechanism shown in full lines in normal position and in dotted lines in an intermediate position; Fig. 5 is a detail perspective view of the rack bar utilized therein; Fig. 6 is a similar view of a lever connecting the rack bar with the pendulum mechanism; Figs. 7 and 8 are side and front views respectively of the guide frames for the rack bar; Fig. 9 is an enlarged detail elevation of the link connecting the pendulum mechanism with the lever actuating the rack bar; Fig. 10 is a detail section showing the rack actuating lever and associate parts. Fig. 11 is a rear elevation, with parts broken away, of another embodiment of my invention; Fig. 12 is an enlarged sectional elevation taken substantially on the line 12—12 of Fig. 11; Fig. 13 is a plan view of a modified form of actuating lever; Fig. 14 is a side elevation thereof, with parts broken away; Figure 15 is an enlarged fragmentary elevation showing the invention as embodied in a single pendulum mechanism.

Referring first to the embodiment illustrated in Figs. 1–10, the numeral 1 designates a housing enclosing the weighing mechanism of the scale and supported upon a suitable column 2 carried upon the base 3 enclosing the usual platform levers (not shown) supporting the platform 4. A main lever 5 is fulcrumed within the column 2 and carries one or more graduated beams of the usual type co-operating with the slidable poise $5^a$. Any suitable connection, such as a steelyard rod, may be used for connecting this main lever 5 with the platform-supporting lever mechanism, and it is to be understood that any desired platform lever mechanism may be utilized, my improved weighing mechanism being adapted for use with many well-known types of such mechanisms.

The housing 1 supports spaced brackets 7 adapted to support the weighing mechanism of the scale, and is preferably provided with a pair of oppositely-disposed supporting arms 6 carrying bearings in which are fulcrumed a pair of pendulums 8 in the inwardly-extending arms of which are provided knife-edge pivots co-acting with stirrups and links 9 which connect the two pendulums with the opposite ends of an equalizer bar 10, which is centrally connected with a steelyard rod 11, the lower end of which is pivotally secured to the main lever 5. The upper portion of the steelyard 11 comprises a forked member $11^a$ between the arms of which is pivoted a link $11^b$ adapted to connect the steelyard with an actuating lever 12, which is fulcrumed at one extremity and connected intermediate its ends to the link $11^b$ (see Figs. 1 and 9). The free extremity of the actuating lever 12 is slotted or bifurcated, as at $12^a$ (see Fig. 6), and the inner walls of the arms thereof coact with spaced rollers 13 mounted upon a transverse shaft 14 which carries the rack bar 15 co-operating with the pinion 16 fixed upon the indicator shaft 17. The index hand 20 is fixed upon the indicator shaft 17 and co-operates with the evenly-graduated chart 21 to indicate the weights of commodities placed upon the scale platform. The rack bar is preferably clamped to the shaft 14 in any suitable manner, as, for example, as illustrated in Fig. 5. The transverse shaft 14 is also provided with outer spaced rollers 18 adapted to move within the slotted guide brackets 19 which are fulcrumed to the inner faces of the supporting brackets or framework 7, these guide brackets being so disposed as to control the movement of the rack bar in a straight line. To facilitate the assembly of the scale and to enable correction of the weighing mechanism should it at any time become out of adjustment, means are provided whereby the position of these guide brackets may be angularly adjusted to change the line of movement of the rack bar, it being understood that after the adjustment has been made the rack bar must continue to move in a straight line parallel with the walls of the guide brackets. As herein shown, an elongated slot 19ª is provided in the base of the guide brackets and the locking screw 19ᵇ is adapted to be loosened to allow the bracket to be swung relatively to the position of the screw and then tightened to hold the bracket in its adjusted position.

The actuating lever 12 may be of any desired shape to facilitate the assembly of the scale, but it is essential to the correct operation of the scale that the fulcrum pivot of the lever and the point of connection therewith with the steelyard 11 be spaced apart a distance equal to that between the fulcrum pivots of the pendulums and the pivot connecting the pendulums with the equalizer bar 10, and that they be maintained in parallel relation thereto. This construction gives a parallelogram whereby the arm of the actuating lever 12 moves through exactly the same arc as do the pendulum arms during the entire operation of the scale. With this construction it has been found that uniform movement may be transmitted to the pinion 16 through the rack 15 when the rack is controlled to travel in a straight line at right angles to the line connecting the fulcrum pivot of the actuating lever 12 and the point of connection with the rack bar when the pendulum arms are in a true horizontal position. In other words, if the rack is mounted to move in a line at right angles to a line showing the position of the actuating lever 12, such as the line A—A in Fig. 1, when the line connecting the edges of the pendulum pivots is horizontal, the arc of movement of the lever on each side of this position will not affect the movement of the rack bar to cause it to depart from its straight path, since the rollers 13 connected with the rack bar are free to move in the bifurcated ends of the actuating lever. As herein shown, the position where the pendulum arms are horizontal is substantially the central point of their path of movement, and they move equal distances on opposite sides of this horizontal position. Accordingly, the position of the actuating lever 12 when the pendulum arms are horizontal is substantially its central position, and the line in which the rack bar travels should be at right angles to this central line position. However, it should be understood that in some scales the movement of the pendulum arms may be entirely below the horizontal position, or entirely above such horizontal position, or the amount of travel on one side of the horizontal position will be much greater than that on the other side thereof. Accurate weighings and indications may be obtained under all of the above arrangements, and it is merely essential that the actuating lever be arranged to have the same arc of movement as the pendulum arms and that the rack bar be connected at right angles to the line connecting the fulcrum pivot of the lever 12 and its point of connection with the rack bar when the pendulum arms are in their horizontal positions. In the present embodiment the position of the actuating levers when the pendulum arms are horizontal will be referred to as the central position for purpose of convenience. At this central position the rollers are closest to the fulcrum pivot of the lever 12 and move outwardly from this position as the lever swings in either direction from the central line, thereby enabling the rack bar to continue to move in a straight line, which is at right angles to the central line position. Mathematically speaking, the relation that is maintained can be expressed with reference to the central line position as follows: The distance between the fulcrum pivot of the lever 12 and the point of connection of the lever with the rack bar varies as the secant of the angle traversed by the lever 12 on each side of the central line. When this relation is maintained, the rack is controlled to move uniformly in a straight line despite the decrease in leverage of the pendulums during the operation of the scale.

In operation, when a load is placed upon the platform of the scale, a pull is exerted through the various scale levers to the steelyard 11, and is then transmitted to the pendulum arms and to the actuating lever 12, whereby the pendulum weights are elevated sufficiently to offset the weight of the load and the pendulum arms and lever 12 are swung downwardly through the same arc, the movement of the actuating lever causing the rack bar 15 to travel a sufficient distance to indicate on the chart the weight of the load. The rack 15 is restrained to travel in a straight line by reason of its mounting in the guide brackets 19, as hereinbefore stated.

Referring to the modification illustrated in Figs. 11 and 12, my improved weighing mechanism is shown embodied in a scale of the cylinder type —i. e., one in which a cylinder bearing weight and value graduations thereon is rotated to indicate with reference to a fixed reading line the weights of commodities. The pendulums $8^a$ are mounted within brackets carried by the framework of the scale, and the arms thereof are provided with pivots whereby connection is made with the equalizer bar $10^a$ which is centrally connected with the link $11^a$, the lower extremity of which is pivotally connected with the scale lever 22. The scale lever is provided with a lateral extension $22^a$ through which connection is made to an intermediate point of the actuating lever $12^a$, through the link 23. The actuating lever $12^a$ is pivoted at one end upon the framework of the scale and at its other end is slotted, the walls of the slots co-acting with the rollers $13^a$ fixed upon the transverse shaft $14^a$ upon which the lower extremity of the rack rod $15^a$ is clamped in any desired manner (see Fig. 12). The transverse shaft $14^a$ is also provided with the rollers $18^a$ fitting within the slots in the guide brackets $19^a$, substantially as described in connection with the first-mentioned embodiment, similar provision for adjustment of the guide brackets being made. In this embodiment the rack bar $15^a$ is restrained to travel in a substantially vertical position, and meshes with a pinion $16^a$ mounted upon the shaft $17^a$ upon which is secured the indicating chart 24. In this embodiment the same relation is maintained as to the parallelogrammatic relation between the pivots of the actuating lever $12^a$ and the pendulum arms, and the rack bar $15^a$ is controlled to move in a straight line at right angles to the central position of the actuating lever. It will be apparent that many other arrangements and combinations may be effected whereby uniform movements of the rack bar may be secured to enable the use of even graduations on the indicating chart as long as the herein disclosed relation of parts is maintained.

In Figs. 13 and 14 is shown a modified form of the actuating lever $12^a$ whereby it is possible to make adjustments varying the amount of travel of the rack bar at different points of its travel. Thus, when the scale weighs fast in the first half of its movement and slow in the second half, it would be possible to correct same by changing the angular position of the slotted extremity $12^b$ of the actuating lever $12^a$ so that when the rollers 15 are moving from their initial position at the zero indication to the central line position, they will have to move up the inclined wall of the bifurcated portion $12^b$, and in moving from the central line position to the extreme or full capacity position, the rollers will be moving down the inclined walls. Similarly, by reversing the slant of the bifurcated portion the scale may be corrected when the reverse condition exists. The bifurcated extremity $12^b$ is pivoted adjacent the end of the lever $12^a$ and has a rearwardly extending arm $12^c$ adapted to be contacted by the oppositely-extending adjusting screws $12^d$, these adjusting screws being suitably threaded in lugs carried by the lever $12^a$.

In the embodiment shown in Figure 15 a single pendulum $8^c$ is connected by means of a link $9^c$ to the steelyard rod $11^c$, the actuating lever, rack bar $15^c$ and pinion $16^c$ being connected to the steelyard rod and arranged as in Figure 4.

While it will be apparent that the illustrated embodiments of my invention herein disclosed are well calculated to adequately fulfill the objects primarily stated, it is to be understood that my invention is susceptible to variation, modification and change without departing from the spirit and scope of the invention as set forth in the subjoined claims.

Having described my invention, I claim:

1. In a weighing scale, the combination of a platform, a pendulum fulcrumed upon fixed bearings and having one arm connected with the platform so as to be rocked downwardly upon imposition of a load upon the platform, indicating mechanism, a supplemental lever arranged between and connected with both the pendulum and the indicating mechanism, the pivot and connection with the pendulum of one arm of said lever being arranged in parallelogrammatic relation with the pivots of said pendulum arm, and the other arm of the lever being of variable length between the pivot and the point of connection with the indicating mechanism and arranged to impart increased uniform movement to the indicating mechanism when the pendulum is rocked.

2. In a scale, the combination of a pendulum fulcrumed upon fixed bearings, indicating mechanism including a rack, a supplemental lever connected with the pendulum and the rack and adapted to swing through the same arc as one of the pendulum arms, the rack being supported by said lever and constrained to travel in a straight line at right angles to a line connecting the lever pivot and the point of connection of the lever with the rack when the pendulum arm is in a horizontal position.

3. In a scale, the combination of a pendulum fulcrumed upon fixed bearings, indicating mechanism including a rack, a supplemental lever connected with the pendulum and the rack and adapted to swing through the same arc as one of the pendulum arms, said lever having a slot therein, and the rack carrying a pin movable in said slot, the rack being arranged to travel in a straight line at right angles to a line connecting the lever pivot and the point of connection of the lever with the rack when the pendulum arm is in a horizontal position, and means for guiding the pin during its travel.

4. In a scale, the combination of a pendulum fulcrumed upon fixed bearings, indicating mechanism including a rack, a supplemental lever connected with the pendulum and the rack and adapted to swing through the same arc as one of the pendulum arms, said lever having a slot therein, and the rack carrying a pin movable in said slot, the rack being arranged to travel in a straight line at right angles to a line connecting the lever pivot and the point of connection of the lever with the rack when the pendulum arm is in a horizontal position, and a frame arranged to guide the pin during its travel.

5. In a scale, the combination of a pendulum fulcrumed upon fixed bearings, indicating mechanism including a rack, a supplemental lever connected with the pendulum and the rack and adapted to swing through the same arc as one of the pendulum arms, said lever having a slot therein, and the rack carrying a pin movable in said slot, the rack being arranged to travel in a straight line at right angles to a line connecting the lever pivot and the point of connection of the lever with the rack when the pendulum arm is in a horizontal position, and spaced guide members for controlling the path of movement of the pin.

6. In a scale, the combination of a pendulum fulcrumed upon fixed bearings, indicating mechanism including a rack, a supplemental lever connected with the pendulum and the rack and adapted to swing through the same arc as one of the pendulum arms, the rack being arranged to travel in a straight line at right angles to a line connecting the lever pivot and the point of connection of the lever with the rack when the pendulum arm is in a horizontal position, and guide members adjustably mounted upon opposite sides of the scale for controlling the movement of the rack.

7. In a scale, the combination of a pendulum fulcrumed upon fixed bearings, indicating mechanism including a rack, a supplemental lever connected with the pendulum and the rack and adapted to swing through the same arc as one of the pendulum arms, the rack being arranged to travel in a straight line at right angles to a line connecting the lever pivot and the point of connection of the lever with the rack when the pendulum arm is in a horizontal position, and means for guiding the rack during its travel, said means being mounted for angular adjustment.

8. In a scale, the combination of a pendulum fulcrumed upon fixed bearings, indicating mechanism including a rack, a supplemental lever connected with the pendulum and the rack and adapted to swing through the same arc as one of the pendulum arms, the rack being arranged to travel in a straight line at right angles to a line connecting the lever pivot and the point of connection of the lever with the rack when the pendulum arm is in a horizontal position, a guide frame for controlling the path of movement of the rack, and means carried by the rack in engagement with said frame.

9. In a scale, the combination of a pendulum fulcrumed upon fixed bearings, indicating mechanism including a rack, a supplemental lever connected with the pendulum and the rack and adapted to swing through the same arc as one of the pendulum arms, the rack being arranged to travel in a straight line at right angles to a line connecting the lever pivot and the point of connection of the lever with the rack when the pendulum arm is in a horizontal position, and means whereby the amount of travel of the rack during the swinging movement of the lever may be varied.

10. In a scale, the combination of a pendulum fulcrumed upon fixed bearings, indicating mechanism including a rack, a supplemental lever connected with the pendulum and the rack and adapted to swing through the same arc as one of the pendulum arms, the rack being arranged to travel in a straight line at right angles to a line connecting the lever pivot and the point of connection of the lever with the rack when the pendulum arm is in a horizontal position, and adjusting means whereby the travel of the rack may be varied with relation to the lever.

11. In a weighing scale, the combination of a pendulum fulcrumed upon fixed bearings, indicating means including a rack, a supplemental lever connected with the pendulum and supporting the rack and arranged to swing through the same arc as one of the pendulum arms, the arrangement being such that the length of the lever arm between the pivot and the point engaging the rack will vary as the secant of the angle traversed by said arm on either side of its position when the pendulum arm is horizontal.

12. In a weighing scale, the combination of a pendulum fulcrumed upon fixed bearings, indicating means including a rack, a supplemental lever connected with the pendulum and supporting the rack and arranged to swing through the same arc as one of the pendulum arms, the effective length of the lever arm between its pivot and point of engagement with the rack varying as the secant of the angle traversed by the lever on either side of its position when the pendulum arm is horizontal.

13. In a scale, the combination of a pendulum fulcrumed upon fixed bearings, a supplemental lever connected with one arm of the pendulum and arranged to swing through the same arc as said pendulum arm, and indicating means including a rack supported by the lever and arranged to travel in a straight line at right angles to the position of the lever when the pendulum arm is in a horizontal position, the distance between the lever pivot and the point of engagement of the rack with the lever varying as the secant of the angle traversed by the lever on either side of its position when the pendulum arm is horizontal.

HALVOR O. HEM.

Witnesses:
C. F. MILLER, Jr.,
EDW. F. ULRICH.